United States Patent
Iwamura et al.

(10) Patent No.: US 10,155,416 B2
(45) Date of Patent: Dec. 18, 2018

(54) AIRLESS TIRE

(71) Applicant: SUMITOMO RUBBER INDUSTRIES, LTD., Kobe-shi (JP)

(72) Inventors: Wako Iwamura, Kobe (JP); Makoto Sugiya, Kobe (JP)

(73) Assignee: SUMITOMO RUBBER INDUSTRIES, LTD., Kobe-shi (JP)

( * ) Notice: Subject to any disclaimer, the term of this patent is extended or adjusted under 35 U.S.C. 154(b) by 178 days.

(21) Appl. No.: 15/296,224

(22) Filed: Oct. 18, 2016

(65) Prior Publication Data

US 2017/0113491 A1    Apr. 27, 2017

(30) Foreign Application Priority Data

Oct. 22, 2015  (JP) .................................. 2015-208348

(51) Int. Cl.
| | |
|---|---|
| *B60C 7/00* | (2006.01) |
| *B60C 7/10* | (2006.01) |
| *B60C 7/22* | (2006.01) |
| *B60C 7/24* | (2006.01) |
| *B60C 9/18* | (2006.01) |
| *B60C 7/18* | (2006.01) |

(Continued)

(52) U.S. Cl.
CPC ................ *B60C 7/24* (2013.01); *B60B 27/06* (2013.01); *B60C 7/10* (2013.01); *B60C 7/18* (2013.01); *B60C 9/18* (2013.01); *B60C 11/0041* (2013.01); *B60C 2007/005* (2013.01); *B60C 2009/1871* (2013.01); *Y02T 10/862* (2013.01)

(58) Field of Classification Search
CPC .... B60C 7/00; B60C 7/10; B60C 7/12; B60C 7/22; B60C 7/24
See application file for complete search history.

(56) References Cited

U.S. PATENT DOCUMENTS

| | | |
|---|---|---|
| 7,201,194 B2 | 4/2007 | Rhyne et al. |
| 2010/0018621 A1 | 1/2010 | Thompsom |
| | (Continued) | |

FOREIGN PATENT DOCUMENTS

| | | |
|---|---|---|
| JP | 4852767 B | 11/2011 |
| JP | 4855646 B | 11/2011 |
| | (Continued) | |

OTHER PUBLICATIONS

Extended European Search Report dated Feb. 24, 2017 in Patent Application No. 16193482.3.

*Primary Examiner* — Justin R Fischer
(74) *Attorney, Agent, or Firm* — Oblon, McClelland, Maier & Neustadt, L.L.P.

(57) ABSTRACT

An airless tire includes a tread ring, a hub positioned on radial direction inner side of the tread ring, and a spoke structure connecting the tread ring and hub. The tread ring includes a reinforcing body including a first reinforcing cord layer, a second reinforcing cord layer and a shear layer such that the first layer is extending in tire circumferential direction, the second layer is positioned on tire radial direction inner side of the first layer and extending in the tire circumferential direction, and the shear layer including elastomer is positioned between the first and second layers, and the shear layer includes first and second portions such that the first portion has loss tangent tan $\delta$ and shear modulus Ee in MPa at temperature of 30° C. satisfying tan $\delta \leq 0.06$ and Ee/tan $\delta \geq 1500$ and the second portion is formed of material different from material of the first portion.

20 Claims, 6 Drawing Sheets

(51) Int. Cl.
*B60B 27/06* (2006.01)
*B60C 11/00* (2006.01)

(56) References Cited

U.S. PATENT DOCUMENTS

2012/0031535 A1    2/2012   Thompson
2012/0318417 A1   12/2012   Dotson et al.
2015/0251498 A1    9/2015   Thompson

FOREIGN PATENT DOCUMENTS

| JP | 4914211 B | 1/2012 |
|----|-----------|--------|
| WO | WO 03/037661 A1 | 5/2003 |
| WO | WO 2008/045098 A1 | 4/2008 |
| WO | WO 2010/071883 A1 | 6/2010 |
| WO | WO 2011/112920 A1 | 9/2011 |

AIRLESS TIRE

CROSS-REFERENCE TO RELATED APPLICATIONS

The present application is based upon and claims the benefit of priority to Japanese Patent Application No. 2015-208348, filed Oct. 22, 2015, the entire contents of which are incorporated herein by reference.

BACKGROUND OF THE INVENTION

Field of the Invention

The present invention relates to an airless tire capable of supporting a load by a structural member without using high-pressure air.

Description of Background Art

In recent years, various airless tires have been proposed, for example, in Japanese Patent No. 4852767, Japanese Patent No. 4914211, and Japanese Patent No. 4855646. An airless tire, without using high pressure air, can support a load by a structural member of its own. Therefore, the airless tire has an advantage that it does not go flat. The entire contents of these publications are incorporated herein by reference.

SUMMARY OF THE INVENTION

According to one aspect of the present invention, an airless tire includes a tread ring having a cylindrical form and a ground contact surface, a hub positioned on a radial direction inner side of the tread ring and formed to be fixed to an axle, and a spoke structure connecting the tread ring and the hub. The tread ring includes a reinforcing body including a first reinforcing cord layer, a second reinforcing cord layer and a shear layer such that the first reinforcing cord layer has an annular form and is extending in a tire circumferential direction, that the second reinforcing cord layer has an annular form and is positioned on a tire radial direction inner side of the first reinforcing cord layer and extending in the tire circumferential direction and that the shear layer including an elastomer is positioned between the first reinforcing cord layer and the second reinforcing cord layer, and the shear layer includes a first portion and a second portion such that the first portion has a loss tangent tan $\delta$ and a shear modulus Ee at a temperature of 30° C. satisfying tan $\delta \leq 0.06$ and Ee/tan $\delta \geq 1500$ where the shear modulus Ee is in MPa and that the second portion is formed of a material different from a material of the first portion.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
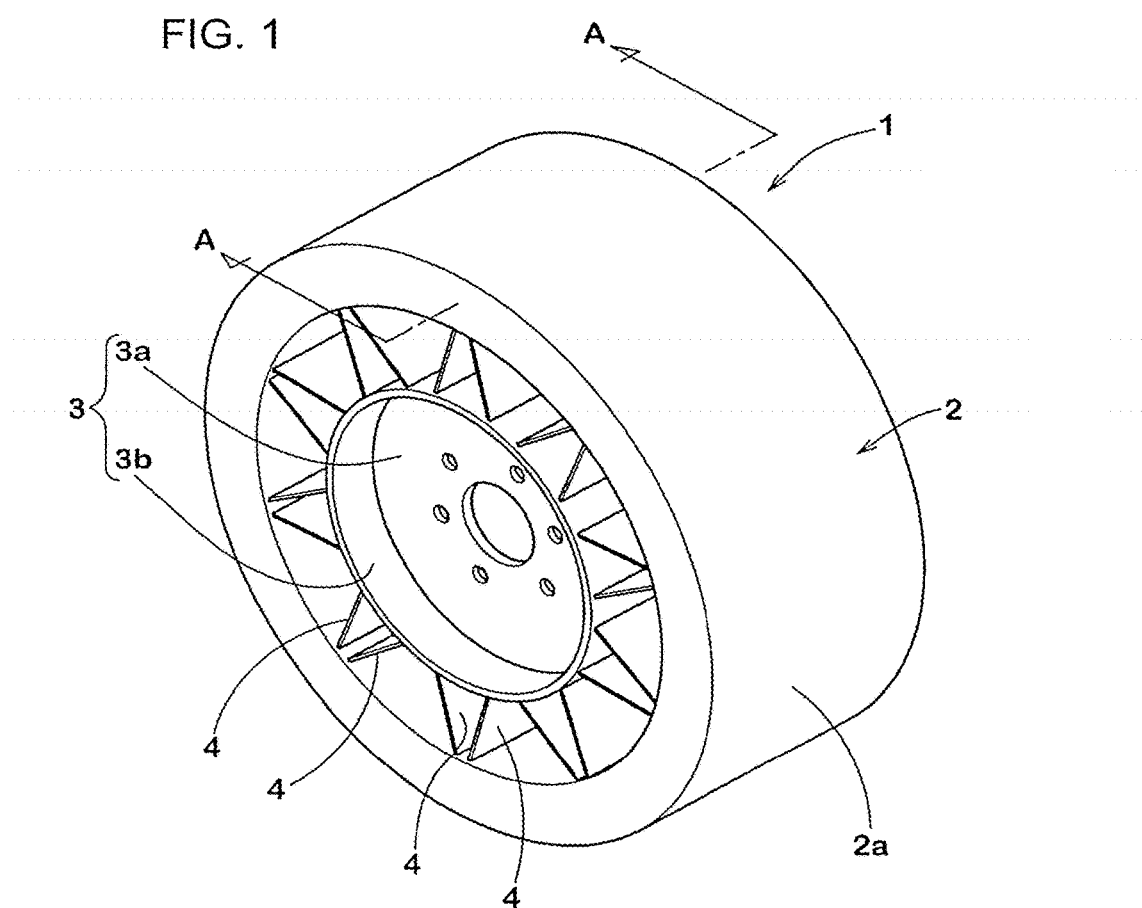
FIG. 1 is an overall perspective view of an airless tire according to an embodiment of the present invention.

The embodiments will now be described with reference to the accompanying drawings, wherein like reference numerals designate corresponding or identical elements throughout the various drawings.

As illustrated in FIG. 1, an airless tire 1 of the present embodiment includes a cylindrical tread ring 2 that has a ground contact surface (2a), a hub part 3 that is positioned on a radial direction inner side of the tread ring 2 and is fixed to an axle, and multiple spokes 4 that connect the tread ring 2 and the hub part 3. In the present embodiment, for example, an airless tire designed for a passenger car is illustrated.

The hub part 3 includes a disc part (3a) that is fixed to the axle, and a cylindrical part (3b) that is formed on an outer periphery of the disc part (3a) and extends in a circumferential direction. Similar to a conventional tire wheel, the hub part 3 can be formed, for example, of a metal material such as steel, aluminum alloy or magnesium alloy.

The spokes 4 each have a plate-like shape. The multiple spokes 4 are provided along the tire circumferential direction. Although not particularly limited, the spokes 4 are formed by a cast-molded body of a polymer material such as polyurethane. For example, the tread ring 2 and the hub part 3 are positioned in advance in a mold, and the polymer material is filled in the mold so as to connect the tread ring 2 and the hub part 3. By curing the polymer material, the spokes 4 that connect the tread ring 2 and the hub part 3 are formed. Regarding a shape of the spokes 4, various embodiments can be adopted in addition to that illustrated in the drawings.

Figure 2:
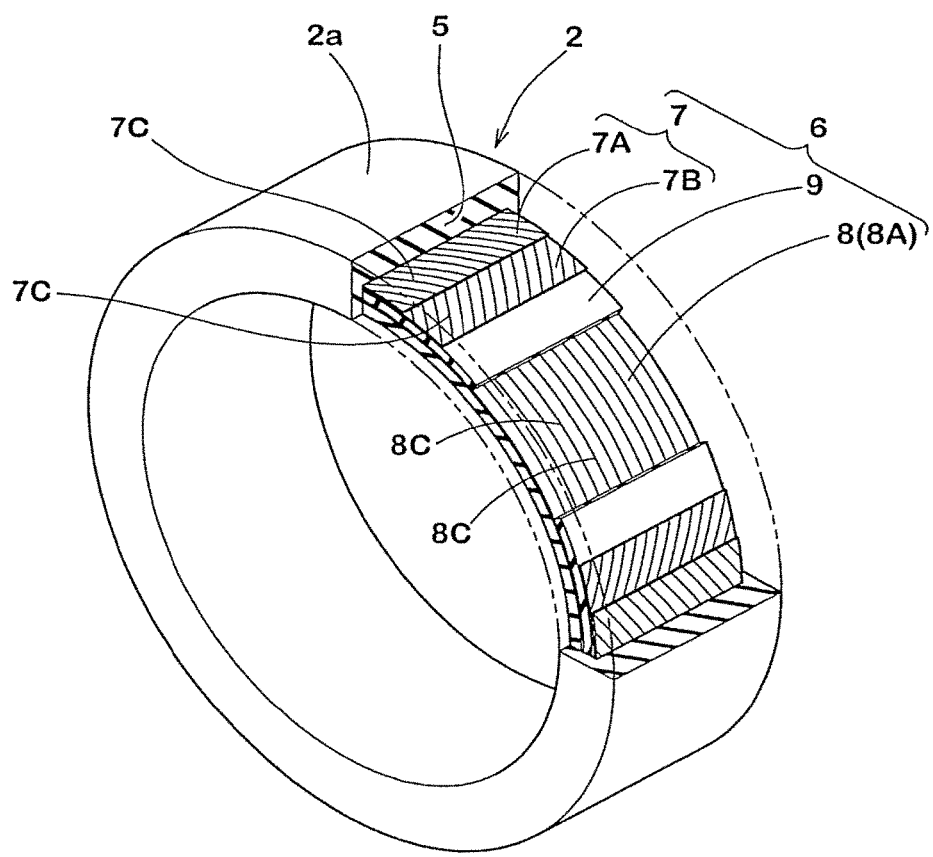
FIG. 2 is a perspective view of a tread ring of the airless tire of FIG. 1.
Figure 3:
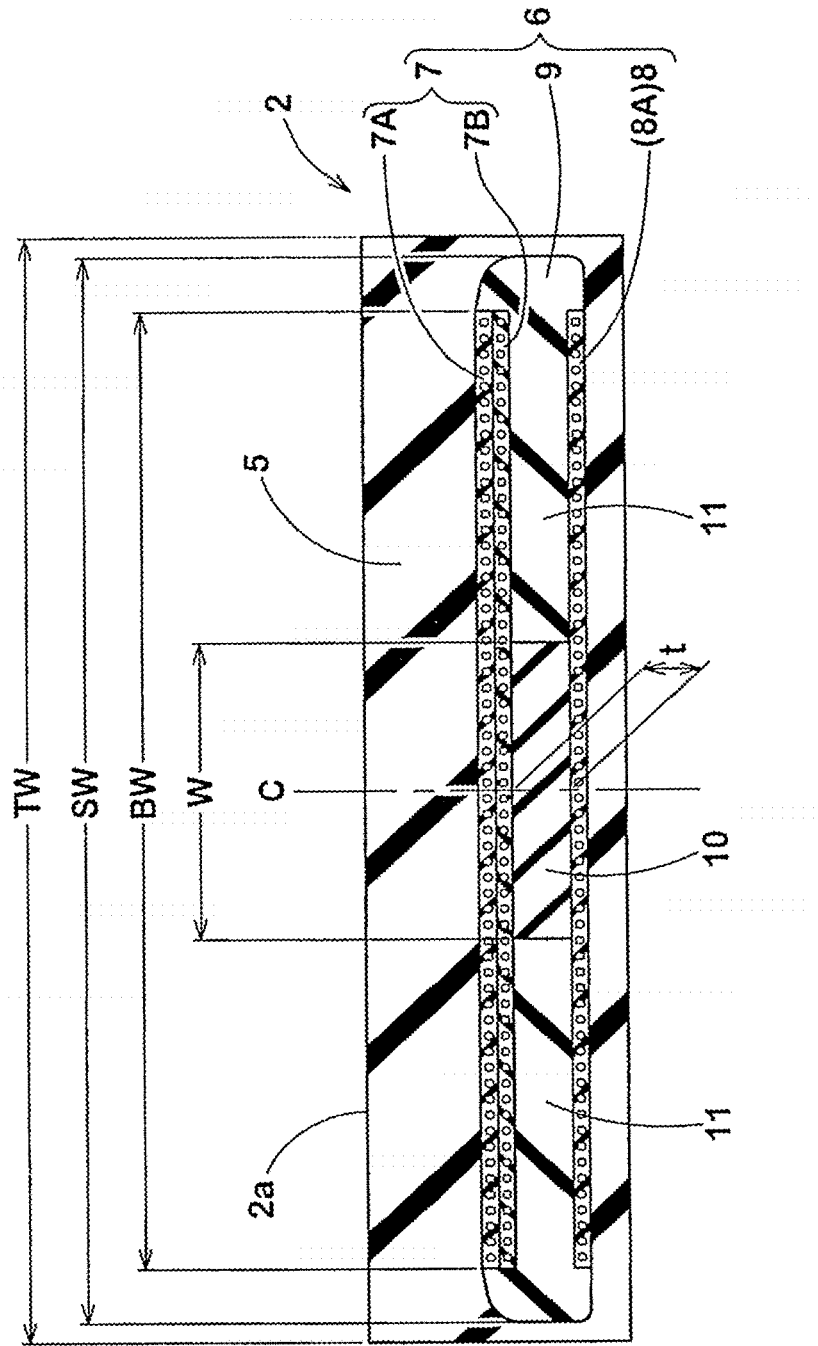
FIG. 3 illustrates a partial cross-sectional view along an A-A line in FIG. 2.

FIG. 2 illustrates a perspective view (partially cut-away view) of the tread ring 2 alone. FIG. 3 illustrates a cross-sectional view along an A-A line in FIG. 1. As illustrated in FIGS. 2 and 3, the tread ring 2 of the present embodiment includes a tread rubber part 5, and a reinforcing body 6 that is formed on a tire radial direction inner side of the tread rubber part 5, and is formed to have a substantially oblong rectangular cross section.

The tread rubber part 5 is formed so as to cover around the reinforcing body 6. A tire radial direction outer surface of the tread rubber part 5 forms the ground contact surface (2a). Since the tread rubber part 5 forms the ground contact surface (2a), a sulfur vulcanized rubber composition that is excellent in frictional force and wear resistance against a road surface can be preferably adopted. In a preferred embodiment, in order to enhance wet performance of the tire, various patterns such as grooves, recesses, and further, holes that penetrate the tread ring 2 (all of these are not illustrated in the drawings) can be formed in the tread rubber part 5.

The reinforcing body 6 includes an annular first reinforcing cord layer 7 that extends in the tire circumferential direction, an annular second reinforcing cord layer 8 that is formed on a tire radial direction inner side of the first reinforcing cord layer 7 and extends in the tire circumferential direction, and a shear layer 9 that is formed of an elastomer and is formed between the first reinforcing cord layer 7 and the second reinforcing cord layer 8. By the first reinforcing cord layer 7 and the second reinforcing cord layer 8, a shape of the tread ring 2 is maintained and load acting on the airless tire 1 is supported.

The first reinforcing cord layer 7, for example, is formed by multiple cord plies. The first reinforcing cord layer 7 of the present embodiment is formed to include an outer ply (7A), and an inner ply (7B) that is formed on an inner side of the outer ply (7A). These plies have substantially the same tire axial direction width. In the present embodiment, a maximum width (BW) of the first reinforcing cord layer 7 is set to be smaller than a width (TW) of the tread ring 2, and preferably can be set to be about 70-95% of the width (TW) of the tread ring 2. Such a first reinforcing cord layer 7 allows a rigidity of the ground contact surface (2a) to be effectively increased.

The outer ply (7A) and the inner ply (7B) are each formed of a cord ply that includes a cord array layer and a topping rubber that covers the cord array layer, the cord array layer being formed by arraying substantially parallel reinforcing cords (7C). As the reinforcing cords (7C), for example, steel cords are preferably adopted. Alternatively, it is also possible to use organic fiber cords that are formed from aramid, polyethylene naphthalate (PEN), polyethylene terephthalate (PET) or the like having high strength and elastic modulus.

The reinforcing cords (7C) of the outer ply (7A) and the reinforcing cords (7C) of the inner ply (7B) are arrayed at the same inclination angle (for example, 15-65 degrees) with respect to the tire circumferential direction, but in mutually opposite inclination directions. As a result, a tire circumferential direction rigidity, a tire axial direction rigidity and a torsional rigidity of the first reinforcing cord layer 7 can be enhanced in a well-balanced manner, and the tread ring 2 can be effectively reinforced. Therefore, when a slip angle is applied to the airless tire 1, similar to a belt cord reinforcing layer of a pneumatic tire, the first reinforcing cord layer 7 can provide a high resistance against an in-plane torsion of the tread rubber part 5, generate a cornering power, and provide excellent turning performance.

The second reinforcing cord layer 8 is formed by at least one cord ply (8A). In a preferred embodiment, the second reinforcing cord layer 8 is formed by fewer cord plies than the first reinforcing cord layer 7. In the present embodiment, the second reinforcing cord layer 8 is formed by one cord ply (8A). A maximum width (BW) of the cord ply (8A) is also set to be smaller than the width (TW) of the tread ring 2, and preferably can be set to be about 70-95% of the width (TW) of the tread ring 2. In the present embodiment, the maximum width of the cord ply (8A) is substantially equal to the maximum width (BW) of the outer ply (7A) (and the inner ply (7B)). Such a second reinforcing cord layer 8 is helpful in weight reduction while maintaining the rigidity of the tread ring 2.

In the present embodiment, the cord ply (8A) of the second reinforcing cord layer 8 has reinforcing cords (8C) that are arrayed parallel to the tire circumferential direction. Here, the term "reinforcing cords (8C) that are arrayed parallel to the tire circumferential direction" includes a case where an angle (θ) formed by a longitudinal direction of the reinforcing cords (8C) and the tire circumferential direction is 0±5 degrees. Also for the cord ply (8A) of the second reinforcing cord layer 8, for example, steel cords are preferably adopted. However, high modulus organic fiber cords such as aramid, polyethylene naphthalate (PEN) and polyethylene terephthalate (PET) may also be used.

Due to the second reinforcing cord layer 8, the tire circumferential direction rigidity of the tread ring 2 is effectively enhanced. As a result, a shape of the ground contact surface (2a) of the tread ring 2 is stable during deceleration and acceleration of a vehicle and thus, brake performance and traction performance are improved. Further, the second reinforcing cord layer 8 having the reinforcing cords (8C) that are arrayed parallel to the tire circumferential direction allows symmetry with respect to a tire circumferential direction line to be ensured while achieving reduction in weight by being a single-layer layer.

The reinforcing body 6 has a sandwich structure in which the shear layer 9 that is sufficiently soft as compared to a tensile elastic modulus the reinforcing cords (7C, 8C) of the cord plies is sandwiched by the first reinforcing cord layer 7 and the second reinforcing cord layer 8. Such a reinforcing body 6 allows a portion of a load that the tread ring 2 receives during running of the tire to be supported by a tire circumferential direction tensile elastic force of the first reinforcing cord layer 7 and the second reinforcing cord layer 8, and allows a deformation amount of the tread ring 2 to be suppressed by effectively increasing a load bearing capacity.

As illustrated in FIG. 3, the shear layer 9 is formed of an elastomer, and includes a first portion 10 and a second portion 11. In the present specification, the term "elastomer" is a general term for all polymeric materials that exhibit rubber elasticity at normal temperatures, and is a concept that includes vulcanized rubber and resin as typical examples.

In order to reduce a rolling resistance while maintaining steering stability of the airless tire 1, a loss tangent (tan δ) and a shear modulus (Ee) (unit: MPa) of the first portion 10 of the shear layer 9 at a temperature of 30° C. satisfy the following Equations (1) and (2).

$$\tan \delta \leq 0.06 \tag{1}$$

$$Ee/\tan \delta \geq 1500 \tag{2}$$

In order to reduce the rolling resistance of the airless tire 1, it is effective to reduce an energy loss of the first portion 10. Therefore, as the first portion 10 of the shear layer 9, a material is preferable that exhibits a low heat generation property such as that, as specified in Equation (1), the loss tangent (tan δ) at a temperature of 30° C. is 0.06 or less, and more preferably, 0.05 or less.

On the other hand, in a sulfur vulcanized rubber, a rubber having a small loss tangent (tan δ) also tends to have a small shear modulus (Ee). In such a case, even when the loss tangent (tan δ) can be reduced, a deformation amount of the shear layer 9 is increased and thus, there is a tendency that the rolling resistance cannot be sufficiently reduced. Therefore, in order to reduce the rolling resistance of the airless tire 1, it is not sufficient to simply limit the loss tangent (tan δ). It is important that a ratio (Ee/tan δ) of the shear modulus (Ee) to the loss tangent (tan δ) be kept in a certain range. From such a point of view, in an embodiment of the present invention, according Equation (2), the ratio (Ee/tan δ) of the shear modulus (Ee) (unit: MPa) to the loss tangent (tan δ) of the first portion at a temperature of 30° C. is set to 1500 (unit: MPa) or more, and more preferably, 2000 or more. By satisfying such specification, the rolling resistance of the airless tire 1 can be sufficiently reduced.

Here, the loss tangent (tan δ) of the elastomer that forms the shear layer 9 is a value that is measured according to JIS-K6394 using a viscoelasticity spectrometer under conditions including an initial strain of 10%, a dynamic strain of ±1%, a frequency of 10 Hz, and a tensile deformation mode. A test specimen can be prepared by cutting from the tread ring 2.

Further, the shear modulus (Ee) of the elastomer is a value of ⅓ times a static tensile modulus that is measured according to JIS K6251 at an elongation of 2.00%. A test specimen can be prepared by cutting from the tread ring 2 after vulcanization.

As long as the above Equations (1) and (2) are satisfied, a material for the first portion 10 is not particularly limited and various materials can be used. As a result of a study conducted by the present inventors, it has been found that, for example, a butadiene-based rubber composition (A) that uses an $\alpha,\beta$-unsaturated carboxylic acid metal salt as a cross-linking agent is preferable as an example of a material that satisfies the above Equations (1) and (2). Table 1 illustrates a composition example of the rubber composition (A).

TABLE 1

| Rubber Composition of First Portion | (Unit: Parts by Mass) Amount |
|---|---|
| Natural Rubber (NR) | 10 |
| Butadiene Rubber (BR) | 90 |
| Carbon Black | 0 |
| $\alpha,\beta$-Unsaturated Carboxylic Acid Metal Salt (Zinc Methacrylate) | 40 |
| Peroxide | 1 |
| Zinc Oxide | 0 |
| Sulfur | 0 |
| Vulcanization Accelerator | 0 |

The rubber composition (A) contains 10-80 parts by mass of an $\alpha,\beta$-unsaturated carboxylic acid metal salt with respect to 100 parts by mass of a rubber component, in which a content rate of a butadiene rubber (BR) is 10-100% by mass, and contains a peroxide. In the rubber composition (A), BR and the $\alpha,\beta$-unsaturated carboxylic acid metal salt co-cross-link with each other with the peroxide as an initiator, and thereby, high elasticity and low heat generation, which are difficult to achieve in a sulfur vulcanized rubber material, are achieved.

The rubber component contains 10-100% by mass of BR in the 100 parts by mass. When BR is used by being blended with another rubber, examples of the rubber for the blending include a natural rubber (NR), a styrene butadiene rubber (SBR), an isoprene rubber (IR), a chloroprene rubber (CR), a styrene isoprene butadiene rubber (SIBR), a styrene-isoprene rubber (SIR), an epoxidized natural rubber (ENR), and the like. These rubbers can be used either individually or in combination of two or more. Among these rubbers, the natural rubber (NR) is preferable for being excellent in low heat generation.

The content rate of BR is 10% or more by mass, and preferably, 20% or more by mass. When the content of BR is below 10% by mass, there is a tendency that a sufficient low heat generation property cannot be obtained. Further, when the content rate of BR is 100% by mass, there is a tendency that strength is reduced. Therefore, the content rate of BR is preferably 90% or less by mass, and more preferably, 80% or less by mass.

As a co-cross-linking agent, for example, a metal salt of an $\alpha,\beta$-unsaturated carboxylic acid, such as an acrylic acid, a methacrylic acid, a maleic acid, a fumaric acid, or an itaconic acid, is adopted. In particular, being excellent in durability, the acrylic acid metal salt or the methacrylic acid metal salt is preferred. The methacrylic acid metal salt is particularly preferred. Further, examples of the metal in the $\alpha,\beta$-unsaturated carboxylic acid metal salt include zinc, sodium, magnesium, calcium, aluminum and the like. For allowing sufficient hardness to be obtained, zinc is preferred.

The content of the co-cross-linking agent ($\alpha,\beta$-unsaturated carboxylic acid metal salt) is 10-80 parts by mass with respect to 100 parts by mass of the rubber component. When the content of the co-cross-linking agent is below 10 parts by mass, there is a risk that a sufficient cross-link density cannot be obtained. Further, when the content of the co-cross-linking agent exceeds 80 parts by mass, there is a risk that the vulcanized rubber composition becomes too hard and the strength is also reduced. From such a point of view, the content of the co-cross-linking agent is preferably 12 parts or more by mass, but is preferably 50 parts or less by mass and more preferably 35 parts or less by mass.

Examples of the peroxide include, for example, a benzoyl peroxide, a dicumyl peroxide, a di-t-butyl peroxide, a t-butyl cumyl peroxide, a methyl ethyl ketone peroxide, a cumene hydroperoxide, a 2,5-dimethyl-2,5-di (t-butylperoxy) hexane, a 2,5-dimethyl-2,5-di (benzoyl peroxy) hexane, a t-butyl peroxy benzene, a 2,4-dichlorobenzoyl peroxide, a 1,1-di-t-butyl peroxy-3,3,5-trimethylcyclohexane, an n-butyl-4,4-di-t-butyl peroxy valerate and the like. These peroxides can be used individually or in combination of two or more. Among these, the dicumyl peroxide is preferable.

It is preferable that the content of the peroxide be 0.1-6.0 parts by mass with respect to 100 parts by mass of the rubber component. When the content of the peroxide is below 0.1 parts by mass, there is a tendency that, in the vulcanized rubber composition, a sufficient hardness cannot be achieved. Further, when the content of the peroxide exceeds 6 parts by mass, the cross-link density becomes too large and there is a tendency that the strength is reduced. From such a point of view, the content of the peroxide is preferably 0.2-2 parts by mass.

The rubber composition (A) may also contain reinforcing filler. Examples of the filler include carbon black, silica, calcium carbonate, clay, talc, alumina, aluminum hydroxide, and the like. However, carbon black is particularly preferred. When the reinforcing filler is contained, a content of the filler is, for example, preferably 90 parts or less by mass and more preferably 50 parts or less by mass with respect to 100 parts by mass of the rubber component. When the content of the reinforcing filler exceeds 90 parts by mass, there is risk that an excellent low heat generation property cannot be obtained.

In addition to the rubber component, the co-cross-linking agent ($\alpha,\beta$-unsaturated carboxylic acid metal salt), the peroxide and the reinforcing filler, the rubber composition (A) may also contain compounding agents that are used in the tire industry, such as a zinc oxide, wax, a stearic acid, oil, an anti-aging agent, and a vulcanization accelerator, within ranges such that the effect according to an embodiment of the present invention is not impaired.

Figure 4:
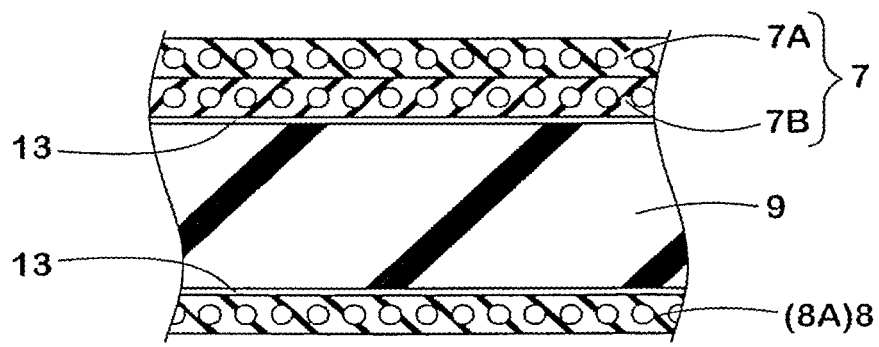
FIG. 4 is an enlarged view of a main part of FIG. 3.

The rubber composition (A) contains the co-cross-linking agent (a, n-unsaturated carboxylic acid metal salt) and thus, does not contain a vulcanizing agent such as sulfur or a sulfur compound. However, when the shear layer 9 is in contact with the first reinforcing cord layer 7 or the second reinforcing cord layer 8, there is a risk that, during vulcanization, sulfur contains in the topping rubber of the first reinforcing cord layer 7 or the second reinforcing cord layer 8 migrates to the shear layer 9 and the physical properties of the shear layer 9 are changed. Therefore, in the present embodiment, as illustrated in the enlarged view of FIG. 4, it is preferable that an insulation layer 13 be interposed between the first reinforcing cord layer 7 and the shear layer 9 and between the second reinforcing cord layer 8 and the shear layer 9 for preventing migration of sulfur.

A material for the insulation layer 13 is not particularly limited as long as prevention of migration of sulfur and an effect of adhesion can be achieved. However, an adhesive (for example, product name: "CHEMLOK" 6100-6254 (LORD Corporation)) is preferred. A thickness of the insulation layer 13 is also not particularly limited. However, in order to achieve a sufficient adhesive force, the thickness of the insulation layer 13 is preferably 3-100 μm, and more preferably, 7-50 μm.

Returning to FIG. 3, in the present embodiment, it is preferable that the first portion 10 be formed at least in a tire axial direction central region of the shear layer 9. Deformation in the central region of the shear layer 9 during running of the tire is particularly large and heat generation and heat accumulation are likely to occur. Therefore, by forming the first portion 10 in this region, a temperature rise in the shear layer 9 can be suppressed and thus, durability can be improved. In a preferred embodiment, the central region of the shear layer 9 includes at least a region of 10% of a tire axial direction maximum width of the shear layer 9 with a width direction center position of the shear layer 9 as a center. By increasing the percentage occupied by the first portion 10 in the shear layer 9, the rolling resistance of the airless tire 1 can be reduced.

On the other hand, the first portion 10 in the present embodiment is formed of a peroxide vulcanized rubber. In a rubber of this kind, as compared the sulfur vulcanized tread rubber part, there is a tendency that a reaction speed is fast and volume expansion occurs in advance. Further, as compared to a sulfur vulcanized rubber composition, the peroxide vulcanized rubber tends to have small elongation and tends to be brittle. Therefore, when the entire shear layer 9 is formed by the first portion 10, there is a risk that a molding defect occurs during vulcanization of the tread ring such as that the first portion 10, for example, is exposed to outside of the tire from a side surface of the tread ring having relatively small resistance, or breakage occurs due to a stress during running of the tire.

In view of the circumstances as described above, the shear layer 9 of the present embodiment is formed to include the first portion 10 and the second portion 11 that is formed of a material different from the first portion 10. As a result, a volume of the first portion 10 can be relatively reduced and, for example, the above-described molding defect or deterioration in the durability can be suppressed.

In a preferred embodiment, the second portion 11 is formed on both tire axial direction sides of the first portion 10. As a result, a problem such as that, during vulcanization molding of the tread ring 2, the first portion 10 is exposed to the outside from a side surface of the tread ring can be suppressed.

The material that forms the second portion 11 is not particularly limited as long as the material is different from the material that forms the first portion 10. However, the second portion 11 is preferably formed of a sulfur vulcanized rubber. The sulfur vulcanized rubber has a larger elongation at breakage as compared to the peroxide vulcanized rubber. Therefore, the second portion 11 can effectively suppress breakage or the like in the first portion 10 by absorbing shear deformation of the shear layer 9 during running of the tire. It is desirable that the sulfur vulcanized rubber that forms the second portion 11, for example, contain a natural rubber as a rubber polymer and do not contain polybutadiene. An example of such a rubber composition is illustrated in Table 2. However, the material of the second portion 11 is not limited to such a specific material.

TABLE 2

| Rubber Composition of Second Portion | Composition Example 1 | (Unit: Parts by Mass) Composition Example 2 |
| --- | --- | --- |
| Natural Rubber (NR) | 100 | 100 |
| Carbon Black | 60 | 70 |
| Process Oil | 10 | 10 |
| Adhesive Resin | 3 | 3 |
| Curing Resin | 10 | 10 |
| Stearic Acid | 2.0 | 2.0 |
| Zinc Oxide | 3.0 | 3.0 |
| Sulfur | 2.0 | 2.0 |
| Vulcanization Accelerator | 3.5 | 3.5 |

In order to maintain productivity and durability while reducing the rolling resistance of the airless tire 1, a tire axial direction width (W) of the first portion 10 is 70% or less, more preferably 50% or less, even more preferably 40% or less, and particularly preferably 20% or less of a tire axial direction maximum width (SW) of the shear layer 9 On the other hand, when the tire axial direction width (W) of the first portion 10 is less than 20% of the tire axial direction maximum width (SW) of the shear layer 9, there is a risk that the effect of reducing the rolling resistance cannot be sufficiently obtained. It is desirable that the maximum width (SW) of the shear layer 9 be at least the same as the maximum width (BW) of the first reinforcing cord layer 7.

Figure 5:
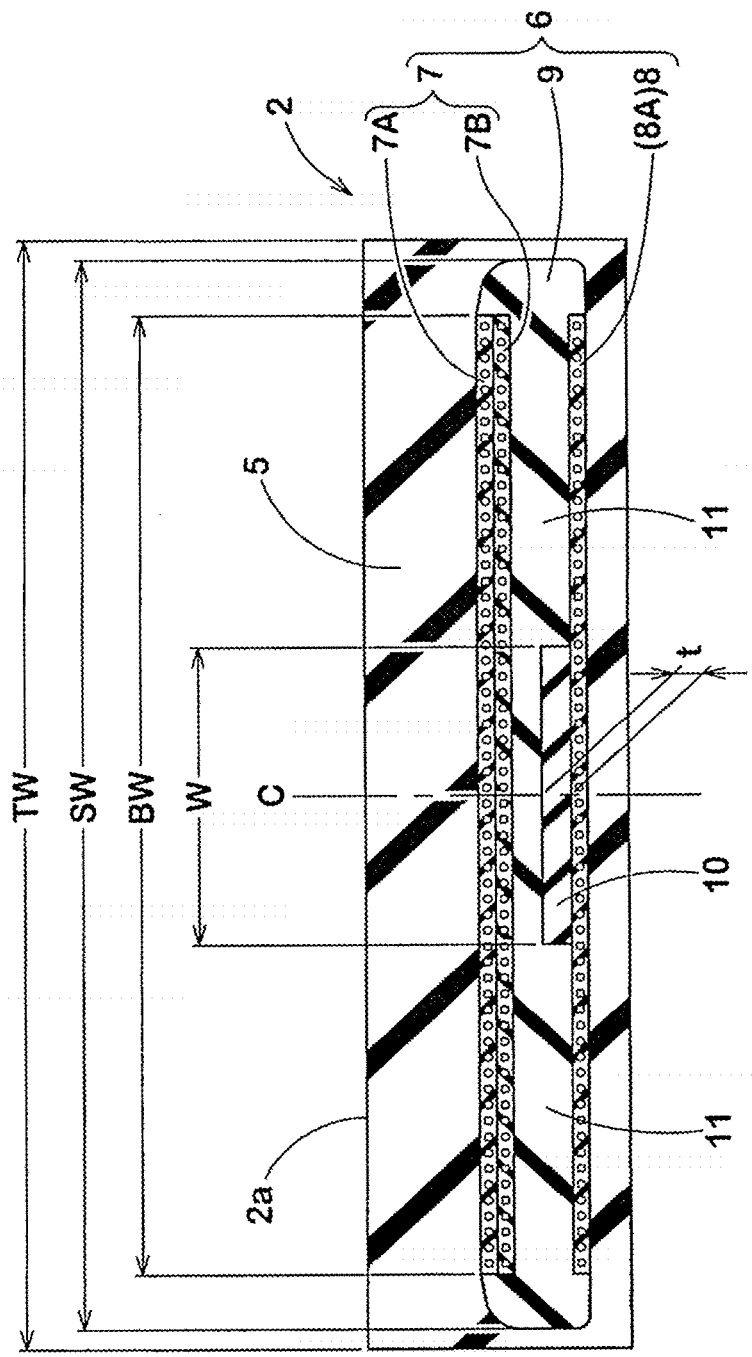
FIG. 5 is a cross-sectional view of a tread ring of an airless tire according to another embodiment of the present invention.

It is desirable that the first portion 10 of the shear layer 9 be formed to be in contact with at least one of the first reinforcing cord layer 7 and the second reinforcing cord layer 8. This is because temperature in these portions is likely to rise. The first portion 10 of the present embodiment is formed to be in contact with both the first reinforcing cord layer 7 and the second reinforcing cord layer 8. It is also possible that the first portion 10 is formed to be in contact with only one of the first reinforcing cord layer and the second reinforcing cord layer. In this case, as illustrated in the embodiment of FIG. 5, it is desirable that the first portion 10 be formed to be in contact with only the second reinforcing cord layer 8. This is because the temperature in this portion is most likely to rise.

A thickness (t) of the first portion 10 is not particularly limited. However, when the thickness (t) is too small, there is a risk that the effect of reducing the rolling resistance cannot be sufficiently obtained. The thickness (t) of the first portion 10 is preferably 2.0 mm or more, and more preferably about 2.0-10 mm.

Figure 6:
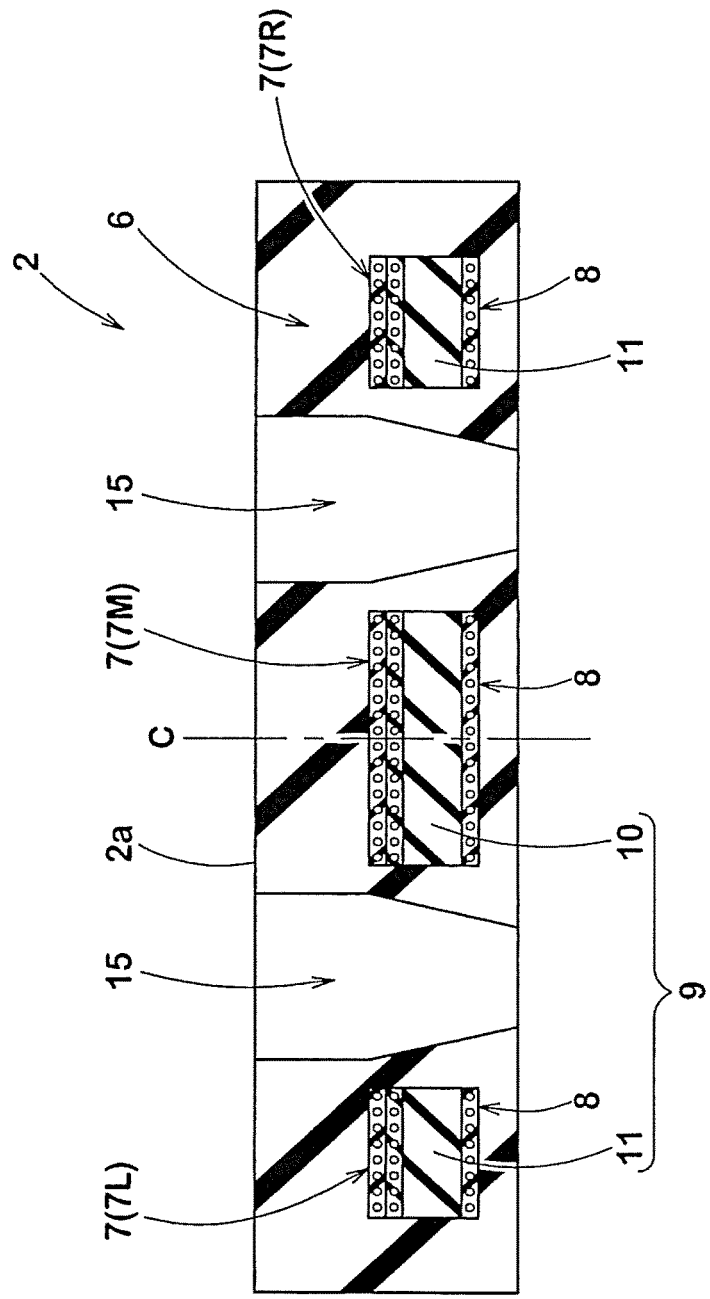
FIG. 6 is a cross-sectional view of a tread ring of an airless tire according to yet another embodiment of the present invention.

FIG. 6 illustrates a cross-sectional view of another embodiment of the tread ring 2 of the airless tire according to an embodiment of the present invention. In the embodiment of FIG. 6, through holes 15 are provided in the tread ring. The through holes 15 allow drainage performance to be significantly improved when the tire is run on a wet road surface. In the embodiment of FIG. 6, the through holes 15 are provided on each side of a tire equator (C) at intervals along the tire circumferential direction.

In order to prevent corrosion or the like of the reinforcing cords, when the through holes 15 are formed in the tread ring 2, the reinforcing body 6 is formed at positions avoiding the through holes 15. In the present embodiment, the reinforcing body 6 is formed to be divided into a central reinforcing body (7M), a left side reinforcing body (7L) and a right side reinforcing body (7R) that respectively correspond to a central region, a left side region and a right side region of the tread ring 2 that are divided by the through holes 15. In the present embodiment, as the shear layer 9, the first portion 10 is used for the central reinforcing body (7M), and the second portion 11 is used for the left side reinforcing body (7L) and the right side reinforcing body (7R). Also in such an embodiment, the above-described effect can be expected.

In the above, an embodiment of the present invention is described in detail. However, the present invention is not limited to the illustrated embodiment and can be embodied in various modified modes.

Examples

Airless tires (tires corresponding to a tire size of 125/80R13) that each form the basic structure of FIG. 1-4 are prototyped, and rolling resistance, durability and productivity are tested. All the tires are formed according to substantially the same specifications except for the shear layer of tread ring. The spokes are integrally molded with the tread ring and the hub part using cast molding method using a urethane resin (thermosetting resin). Main common specifications are as follows.

First Reinforcing Cord Layer
  Number of Plies: 2
  Reinforcing Cords: Steel Cords
  Angles of Cords: +21 degrees, −21 degrees (with respect to tire equator)
Second Reinforcing Cord Layer
  Number of Plies: 1
  Reinforcing Cords: Steel Cords
  Angle of Cords: 0 degree (with respect to tire equator)
Insulation Layer
  Adhesive: CHEMLOK 6125 (LORD Corporation), 10 μm Further, in Example 7 only, the tire radial direction inner side surface of the shear layer 9 is apart from the second reinforcing cord layer.

Further, for the second portion of the shear layer, a sulfur vulcanized rubber composition (B) using a diene-based rubber is used, and the shear modulus (Ee) and the loss tangent (tan δ) are varied by adjusting contents of carbon black and sulfur. Further, for the first portion, the rubber composition (A) having the composition of Table 1 as a basic composition is used, and the shear modulus (Ee) and the loss tangent (tan δ) are varied by adjusting the content of the α,β-unsaturated carboxylic acid metal salt. A test method is as follows.

Rolling Resistance

Rolling resistance is measured using a rolling resistance testing machine under a condition in which a speed is 40 km/h and a load is 1.5 kN (other conditions are in conformity with the JASO), and a rolling resistance coefficient is calculated according to the following equation. A smaller value indicates better rolling resistance performance.

Rolling Resistance Coefficient=(Rolling Resistance)/Load×$10^4$

Durability

Each of the airless tires is run using a drum testing machine, and a running time until the tire is broken was measured. The result is an index number with a running time of Comparative Example 3 as 100. A larger index number indicates a better durability.
  Load: 1.5 kN
  Running Speed: 60 km/h
  Slip Angle: 0 degree Productivity A single body of a tread ring is molded by vulcanization and thereafter is dismantled. Finishing accuracy of the first portion is observed and evaluated with naked eyes. A first portion that is out of standard is treated as a molding failure, and a non-failure rate is measured. The result is an index number with a non-failure rate of Comparative Example 2 as 100. A larger index number indicates a better productivity.

The test results are illustrated in Table 3.

TABLE 3

|  | Comparative Example 1 | Comparative Example 2 | Comparative Example 3 | Comparative Example 4 | Comparative Example 5 | Example 1 | Example 2 |
|---|---|---|---|---|---|---|---|
| Tanδ of First Portion | 0.30 | 0.07 | 0.05 | 0.05 | 0.05 | 0.05 | 0.05 |
| Ee/tanδ (MPa) | 2000 | 2000 | 1000 | 2000 | 2000 | 2000 | 2000 |
| (Width (SW) of Shear Layer)/(Width (TW) of Tread Ring) | 0.90 | 0.90 | 0.90 | 0.90 | 0.60 | 0.90 | 0.90 |
| (Width (W) of First Portion)/(Width (SW) of Shear Layer) | 0.60 | 0.60 | 0.60 | 1.00 | 1.00 | 0.60 | 0.70 |
| (Width of Second Portion)/(Width (SW) of Shear Layer) | 0.40 | 0.40 | 0.40 | 0 | 0 | 0.40 | 0.30 |
| Thickness (t) of Shear Layer (mm) | 3.0 | 3.0 | 3.0 | 3.0 | 3.0 | 3.0 | 3.0 |
| Rolling Resistance Coefficient | 160 | 150 | 160 | 130 | 150 | 140 | 135 |
| Durability (Index Number) | 70 | 100 | 70 | 100 | 100 | 100 | 100 |
| Productivity (Index Number) | 100 | 90 | 100 | 50 | 100 | 90 | 90 |

|  | Example 3 | Example 4 | Example 5 | Example 6 | Example 7 | Example 8 | Example 9 | Example 10 |
|---|---|---|---|---|---|---|---|---|
| Tanδ of First Portion | 0.05 | 0.05 | 0.05 | 0.05 | 0.05 | 0.05 | 0.05 | 0.06 |
| Ee/tanδ (MPa) | 2000 | 2000 | 2000 | 2000 | 2000 | 2000 | 2000 | 2000 |
| (Width (SW) of Shear Layer)/(Width (TW) of Tread Ring) | 0.90 | 0.90 | 0.90 | 0.90 | 0.90 | 0.90 | 0.90 | 0.90 |
| (Width (W) of First Portion)/(Width (SW) of Shear Layer) | 0.80 | 0.20 | 0.10 | 0.05 | 0.60 | 0.60 | 0.60 | 0.60 |
| (Width of Second Portion)/(Width (SW) of Shear Layer) | 0.20 | 0.80 | 0.90 | 0.95 | 0.40 | 0.40 | 0.40 | 0.40 |
| Thickness (t) of Shear Layer (mm) | 3.0 | 3.0 | 3.0 | 3.0 | 3.0 | 2.0 | 1.0 | 3.0 |
| Rolling Resistance Coefficient | 132 | 145 | 160 | 180 | 140 | 155 | 160 | 145 |
| Durability (Index Number) | 100 | 100 | 100 | 100 | 90 | 90 | 80 | 100 |
| Productivity (Index Number) | 50 | 90 | 90 | 80 | 90 | 100 | 100 | 90 |

As illustrated in Table 3, it can be confirmed that the tires of the examples allow rolling resistance to be reduced without compromising durability and productivity.

Results of various experiments carried out by the inventors indicate that an airless tire has a large rolling resistance, about 2.5 times that of a pneumatic tire of the same size. One reason for the large rolling resistance is energy loss in a shear layer that is formed of an elastomer and is formed in a tread ring of an airless tire. The energy loss causes the shear layer, and thus the tread ring, to generate heat. When temperature rises in the tread ring, there is a risk that durability of the tread ring is decreased. Further, the large rolling resistance of the airless tire also leads to deterioration in fuel consumption of a vehicle.

An airless tire according to an embodiment of the present invention is capable reducing a rolling resistance.

An airless tire according an embodiment of the present invention includes: a cylindrical tread ring that has a ground contact surface; a hub part that is positioned on a radial direction inner side of the tread ring and is fixed to an axle; and a spoke that connects the tread ring and the hub part. The tread ring has therein a reinforcing body. The reinforcing body includes: an annular first reinforcing cord layer that extends in a tire circumferential direction; an annular second reinforcing cord layer that is formed on a tire radial direction inner side of the first reinforcing cord layer and extends in the tire circumferential direction; and a shear layer that is formed of an elastomer and is formed between the first reinforcing cord layer and the second reinforcing cord layer. The shear layer includes a first portion and a second portion, a loss tangent (tan $\delta$) and a shear modulus (Ee) (unit: MPa) of the first portion at a temperature of 30° C. satisfying the following Equations (1) and (2), and the second portion being formed of a material different from the first portion.

$$\tan \delta \leq 0.06 \tag{1}$$

$$Ee/\tan \delta \geq 1500 \tag{2}$$

In another aspect of the present invention, the first portion may be formed in a tire axial direction central region of the shear layer, and the second portion may be formed on both tire axial direction sides of the first portion.

In another aspect of the present invention, a tire axial direction width of the first portion may be 10%-70% of a tire axial direction maximum width of the shear layer.

In another aspect of the present invention, a tire axial direction width of the first portion may be 10%-20% of a tire axial direction maximum width of the shear layer.

In another aspect of the present invention, the first portion may be formed to be in contact with at least one of the first reinforcing cord layer and the second reinforcing cord layer.

In another aspect of the present invention, the first portion may be formed to be in contact with both of the first reinforcing cord layer and the second reinforcing cord layer.

In another aspect of the present invention, a thickness of the first portion may be 2.0 mm or more.

In another aspect of the present invention, the first portion may be a peroxide vulcanized rubber, and the second portion may be a sulfur vulcanized rubber.

An airless tire according to an embodiment of the present invention includes the tread ring that has the shear layer. At least a portion of the shear layer is formed by the first portion of which the loss tangent (tan $\delta$) and the shear modulus (Ee) (unit: MPa) at a temperature of 30° C. satisfy the following Equations (1) and (2).

$$\tan \delta \leq 0.06 \tag{1}$$

$$Ee/\tan \delta \geq 1500 \tag{2}$$

Such an airless tire allows the rolling resistance to be reduced by the first portion of the shear layer. Further, due to the first portion, deterioration in durability due to heat generation in the tread ring and deterioration in fuel consumption of a vehicle can be prevented. Further, a portion of the shear layer is formed by the second portion that is formed of a material different from the first portion. Therefore, the second portion can provide physical properties different from the first portion.

Obviously, numerous modifications and variations of the present invention are possible in light of the above teachings. It is therefore to be understood that within the scope of the appended claims, the invention may be practiced otherwise than as specifically described herein.

The invention claimed is:

1. An airless tire, comprising:
    a tread ring having a cylindrical form and a ground contact surface;
    a hub positioned on a radial direction inner side of the tread ring and configured to be fixed to an axle; and
    a spoke structure connecting the tread ring and the hub, wherein the tread ring includes a reinforcing body comprising a first reinforcing cord layer, a second reinforcing cord layer and a shear layer such that the first reinforcing cord layer has an annular form and is extending in a tire circumferential direction, that the second reinforcing cord layer has an annular form and is positioned on a tire radial direction inner side of the first reinforcing cord layer and extending in the tire circumferential direction and that the shear layer comprising an elastomer is positioned between the first reinforcing cord layer and the second reinforcing cord layer, and the shear layer includes a first portion and a second portion such that the first portion has a loss tangent tan $\delta$ and a shear modulus Ee at a temperature of 30° C. satisfying tan $\delta \leq 0.06$ and Ee/tan $\delta \geq 1500$ where the shear modulus Ee is in MPa and that the second portion is formed of a material different from a material of the first portion.

2. The airless tire according to claim 1, wherein the shear layer is formed such that the first portion is formed in a tire axial direction central region of the shear layer and that the second portion is formed on both tire axial direction sides of the first portion.

3. The airless tire according to claim 1, wherein the shear layer is formed such that the first portion has a tire axial direction width set in a range of from 10% to 70% of a tire axial direction maximum width of the shear layer.

4. The airless tire according to claim 1, wherein the shear layer is formed such that the first portion has a tire axial direction width set in a range of from 10% to 20% of a tire axial direction maximum width of the shear layer.

5. The airless tire according to claim 1, wherein the shear layer is formed such that the first portion is formed in contact with at least one of the first reinforcing cord layer and the second reinforcing cord layer.

6. The airless tire according to claim 1, wherein the shear layer is formed such that the first portion is formed in contact with the first reinforcing cord layer and the second reinforcing cord layer.

7. The airless tire according to claim 1, wherein the shear layer is formed such that the first portion has a thickness set in a range of 2.0 mm or more.

8. The airless tire according to claim 1, wherein the shear layer is formed such that the first portion comprises a peroxide vulcanized rubber, and the second portion comprises a sulfur vulcanized rubber.

9. The airless tire according to claim 2, wherein the shear layer is formed such that the first portion has a tire axial direction width set in a range of from 10% to 70% of a tire axial direction maximum width of the shear layer.

10. The airless tire according to claim 2, wherein the shear layer is formed such that the first portion has a tire axial direction width set in a range of from 10% to 20% of a tire axial direction maximum width of the shear layer.

11. The airless tire according to claim 2, wherein the shear layer is formed such that the first portion is formed in contact with at least one of the first reinforcing cord layer and the second reinforcing cord layer.

12. The airless tire according to claim 2, wherein the shear layer is formed such that the first portion is formed in contact with the first reinforcing cord layer and the second reinforcing cord layer.

13. The airless tire according to claim 2, wherein the shear layer is formed such that the first portion has a thickness set in a range of 2.0 mm or more.

14. The airless tire according to claim 2, wherein the shear layer is formed such that the first portion comprises a peroxide vulcanized rubber, and the second portion comprises a sulfur vulcanized rubber.

15. The airless tire according to claim 3, wherein the shear layer is formed such that the first portion is formed in contact with at least one of the first reinforcing cord layer and the second reinforcing cord layer.

16. The airless tire according to claim 3, wherein the shear layer is formed such that the first portion is formed in contact with the first reinforcing cord layer and the second reinforcing cord layer.

17. The airless tire according to claim 3, wherein the shear layer is formed such that the first portion has a thickness set in a range of 2.0 mm or more.

18. The airless tire according to claim 3, wherein the shear layer is formed such that the first portion comprises a peroxide vulcanized rubber, and the second portion comprises a sulfur vulcanized rubber.

19. The airless tire according to claim 4, wherein the shear layer is formed such that the first portion is formed in contact with at least one of the first reinforcing cord layer and the second reinforcing cord layer.

20. The airless tire according to claim 1, wherein the shear layer is formed such that the first portion is formed of a peroxide vulcanized rubber, and the second portion is formed of a sulfur vulcanized rubber.

* * * * *